US011993226B2

(12) United States Patent
Furuta et al.

(10) Patent No.: US 11,993,226 B2
(45) Date of Patent: May 28, 2024

(54) ON-VEHICLE CONTROL DEVICE, ON-VEHICLE CONTROL METHOD AND COMPUTER PROGRAM

(71) Applicants: Sumitomo Wiring Systems, Ltd., Yokkaichi (JP); ALPS ALPINE CO., LTD., Tokyo (JP)

(72) Inventors: Takuya Furuta, Yokkaichi (JP); Akira Miyazawa, Tokyo (JP)

(73) Assignees: SUMITOMO WIRING SYSTEMS, LTD., Yokkaichi (JP); ALPS ALPINE CO., LTD., Tokyo (JP)

( * ) Notice: Subject to any disclaimer, the term of this patent is extended or adjusted under 35 U.S.C. 154(b) by 541 days.

(21) Appl. No.: 17/286,357

(22) PCT Filed: Sep. 30, 2019

(86) PCT No.: PCT/JP2019/038461
§ 371 (c)(1),
(2) Date: Apr. 16, 2021

(87) PCT Pub. No.: WO2020/080076
PCT Pub. Date: Apr. 23, 2020

(65) Prior Publication Data
US 2021/0370870 A1     Dec. 2, 2021

(30) Foreign Application Priority Data

Oct. 19, 2018    (JP) ................................. 2018-197808

(51) Int. Cl.
*B60R 25/20*     (2013.01)
*B60R 25/24*     (2013.01)
(Continued)

(52) U.S. Cl.
CPC ............ *B60R 25/209* (2013.01); *B60R 25/24* (2013.01); *B60R 25/31* (2013.01); *G08C 17/02* (2013.01)

(58) Field of Classification Search
CPC ....... B60R 25/209; B60R 25/24; B60R 25/31; B60R 25/245; G08C 17/02; E05B 49/00; H04Q 9/00
See application file for complete search history.

(56) References Cited

U.S. PATENT DOCUMENTS 9,378,603 B2    6/2016   Seino
2013/0099940 A1*   4/2013   Protopapas ............. B60R 25/23
                                                                                              701/1
(Continued)

FOREIGN PATENT DOCUMENTS

CN          107444340 A     12/2017
JP          2010-121297 A    6/2010
(Continued)

OTHER PUBLICATIONS

International Search Report, Application No. PCT/JP2019/038461, dated Dec. 10, 2019. ISA/Japan Patent Office.
(Continued)

*Primary Examiner* — Adam R Mott
*Assistant Examiner* — Erick T. Detweiler
(74) *Attorney, Agent, or Firm* — Honigman LLP

(57) ABSTRACT

An on-vehicle control device includes a transmission unit transmitting to a mobile device a response request signal requesting a response in response to operation of instructing a start of a driving source causing a vehicle to drive. An authentication unit authenticates the mobile device and performs start control of the driving source depending on success or failure of authentication by the authentication unit. A determination unit determines a presence or an
(Continued)

absence of unauthorized authentication for the authentication unit. A detection unit detects an authorized occupant for the vehicle. A start prohibition unit prohibits the start of the driving source when the determination unit determines that unauthorized authentication is present for the authentication unit. A start permission unit permits the start of the driving source regardless of determination by the determination unit when the detection unit detects the occupant.

11 Claims, 7 Drawing Sheets

(51) Int. Cl.
  *B60R 25/31* (2013.01)
  *G08C 17/02* (2006.01)

(56) References Cited

U.S. PATENT DOCUMENTS

| | | |
|---|---|---|
| 2015/0145646 A1 | 5/2015 | Seino |
| 2015/0302673 A1 | 10/2015 | Seiberts et al. |
| 2017/0120868 A1* | 5/2017 | Watanabe ............... E05B 81/78 |
| 2017/0327085 A1 | 11/2017 | Nishiyama et al. |

FOREIGN PATENT DOCUMENTS

| | | |
|---|---|---|
| JP | 2012-060482 A | 3/2012 |
| JP | 2012-175518 A | 9/2012 |
| JP | 2013136299 A | 7/2013 |
| JP | 2013237388 A | 11/2013 |
| JP | 2016-003539 A | 1/2016 |
| JP | 2018-020611 A | 2/2018 |
| WO | 2016-059451 A1 | 4/2016 |
| WO | 2017-110207 A1 | 6/2017 |
| WO | 2018-127353 A1 | 7/2018 |

OTHER PUBLICATIONS

First Chinese Office Action, Application No. 201980067171.7, dated Jul. 14, 2022.

* cited by examiner

ON-VEHICLE CONTROL DEVICE, ON-VEHICLE CONTROL METHOD AND COMPUTER PROGRAM

CROSS-REFERENCE TO RELATED APPLICATIONS

This application is the U.S. national stage of PCT/JP2019/038461 filed on Sep. 30, 2019, which claims priority of Japanese Patent Application No. JP2018-197808 filed on Oct. 19, 2018, the contents of which are incorporated herein.

TECHNICAL FIELD

The present disclosure relates to an on-vehicle control device, an on-vehicle control method and a computer program.

BACKGROUND

A communication system for a vehicle has come in practice that performs locking and unlocking of vehicle doors without using a mechanical key. More specifically, a keyless entry system that performs locking or unlocking of vehicle doors by wireless remote control using a mobile device held by the user, and a smart entry (registered trademark) system that performs unlocking of vehicle doors by the user with a mobile device approaching a vehicle or merely grasping the door handle have come in practice (see Japanese Patent Application Laid-Open Publication No. 2015-101908, for example). Furthermore, a communication system for a vehicle that starts the engine of a vehicle without using the mechanical key has also put to practical use. More specifically, a push start system that starts the engine by the user holding a mobile device merely pushing an engine start button has put to practical use. Moreover, a welcome light system that turns on the room light or the outdoor light of a vehicle when the user holding a mobile device approaches the vehicle has come in practice.

In the above-described communication system for a vehicle, the on-vehicle control device performs radio communication with the mobile device. The radio communication is so performed that the on-vehicle control device transmits various signals to the mobile device using radio waves in the low frequency (LF) band from the transmission antennas while the mobile device having received the signals transmits a response signal using radio waves in the radio frequency (RF) band. The on-vehicle control device performs control of unlocking, locking, starting of the engine, turning on of a welcome light or the like after authentication and localization of the mobile device.

Meanwhile, the signals transmitted from the on-vehicle control device are signals in the LF band, and a transmittable range for the signals is limited to a predetermined range around the vehicle. The situation in which a signal in the LF band transmitted from the on-vehicle control device is received by the mobile device and a signal in the RF band is returned from the mobile device in response thereto essentially occurs only when an occupant holding an authorized mobile device is present inside or around the vehicle.

However, by using a relay device that relays a signal in the LF band transmitted from the on-vehicle control device to the mobile device and relays a signal in the RF band transmitted from the mobile device to the on-vehicle control device, communication between the on-vehicle control device and the mobile device is made possible even when the occupant holding the mobile device is away from the vehicle C. In the case where unauthorized authentication occurs for the on-vehicle control device due to a relay attack using such a relay device, the engine or the like as a driving source of the vehicle may be started even when an authorized occupant is not present inside or around the vehicle.

Hereupon, an on-vehicle control device has been proposed that determines the presence or absence of unauthorized authentication using the relay device, and prohibits the start of the driving source when it is determined that the unauthorized authentication occurs.

In such an on-vehicle control device, it is necessary to accurately discriminate between a signal transmitted from the mobile device and a signal transmitted via the relay device. The discrimination accuracy, however, depends on the number of LF antennas, their arrangements, etc., so that the on-vehicle control device has a possibility of erroneously identifying a signal from the authorized mobile device as a signal from the relay device. In this case, even when an authorized occupant is in the vehicle, he or she may not be able to start the driving source of the vehicle.

The present disclosure is made in view of such circumstances, and an object is to provide an on-vehicle control device, an on-vehicle control method and a computer program that can reduce a possibility that an authorized occupant cannot start the driving source of a vehicle.

An on-vehicle control device according to one aspect of the present application is an on-vehicle control device including a transmission unit that transmits to a mobile device a response request signal requesting a response in response to operation of instructing a start of a driving source causing a vehicle to drive and an authentication unit that authenticates the mobile device based on a response signal from the mobile device in response to the response request signal, and performing start control of the driving source depending on success or failure of authentication by the authentication unit includes: a determination unit that determines a presence or absence of unauthorized authentication for the authentication unit; a detection unit that detects an authorized occupant for the vehicle; a start prohibition unit that prohibits the start of the driving source in a case where the determination unit determines that unauthorized authentication is present for the authentication unit; and a start permission unit that permits the start of the driving source regardless of determination by the determination unit in a case where the detection unit detects the occupant.

An on-vehicle control device according to one aspect of the present application is an on-vehicle control device including a transmission unit that transmits to a mobile device a response request signal requesting a response in response to operation of instructing a start of a driving source causing a vehicle to drive and an authentication unit that authenticates the mobile device based on a response signal from the mobile device in response to the response request signal, and performing start control of the driving source depending on success or failure of authentication by the authentication unit includes: a detection unit that detects an authorized occupant for the vehicle; a determination unit that determines a presence or an absence of unauthorized authentication for the authentication unit; and a start prohibition unit that prohibits the start of the driving source in a case where the determination unit determines that unauthorized authentication is present for the authentication unit, and the determination unit uses different determination thresholds between a case where the detection unit detects the occupant and a case where the detection unit does not detect the occupant.

An on-vehicle control method according to one aspect of the present application is an on-vehicle control method of transmitting to a mobile device a response request signal requesting a response in response to operation of instructing a start of a driving source causing a vehicle to drive, executing authentication processing for authenticating the mobile device based on a response signal from the mobile device in response to the response request signal, and performing start control of the driving source depending on success or failure of authentication by the authentication processing includes: determining a presence or an absence of unauthorized authentication for the authentication processing; detecting an authorized occupant for the vehicle; prohibiting the start of the driving source in a case where the presence of unauthorized authentication for the authentication processing is determined; and permitting the start of the driving source regardless of determination as to the presence or absence of the unauthorized authentication in a case where the occupant is detected.

An on-vehicle control method according to one aspect of the present application is an on-vehicle control method of transmitting to a mobile device a response request signal requesting a response in response to operation of instructing a start of a driving source causing a vehicle to drive, executing authentication processing for authenticating the mobile device based on a response signal from the mobile device in response to the response request signal, and performing start control of the driving source depending on success or failure of authentication by the authentication processing includes: detecting an authorized occupant for the vehicle; setting different determination thresholds between a case where the occupant is detected and a case where the occupant is not detected; determining a presence or an absence of unauthorized authentication for the authentication processing by using the determination thresholds set; and prohibiting the start of the driving source in a case where the presence of unauthorized authentication for the authentication processing is determined.

A computer program according to one aspect of the present application is a computer program causing an on-vehicle control device to execute processing of transmitting to a mobile device a response request signal requesting a response in response to operation of instructing a start of a driving source causing a vehicle to drive, executing authentication processing for authenticating the mobile device based on a response signal from the mobile device in response to the response request signal, and performing start control of the driving source depending on success or failure of authentication by the authentication processing includes: determining a presence or an absence of unauthorized authentication for the authentication processing; detecting an authorized occupant for the vehicle; prohibiting the start of the driving source in a case where the presence of unauthorized authentication for the authentication processing is determined; and permitting the start of the driving source regardless of determination as to the presence or absence of the unauthorized authentication in a case where the occupant is detected.

A computer program according to one aspect of the present application is a computer program causing an on-vehicle control device to execute processing of transmitting to a mobile device a response request signal requesting a response in response to operation of instructing a start of a driving source causing a vehicle to drive, executing authentication processing for authenticating the mobile device based on a response signal from the mobile device in response to the response request signal, and performing start control of the driving source depending on success or failure of authentication by the authentication processing includes: detecting an authorized occupant for the vehicle; setting different determination thresholds between a case where the occupant is detected and a case where the occupant is not detected; determining a presence or an absence of unauthorized authentication for the authentication processing by using the determination thresholds set; and prohibiting the start of the driving source in a case where the presence of unauthorized authentication for the authentication processing is determined.

Advantageous Effects

According to the present application, it is possible to reduce a possibility that an authorized occupant cannot start the driving source of a vehicle.

DETAILED DESCRIPTION OF PREFERRED EMBODIMENTS

Figure 1:
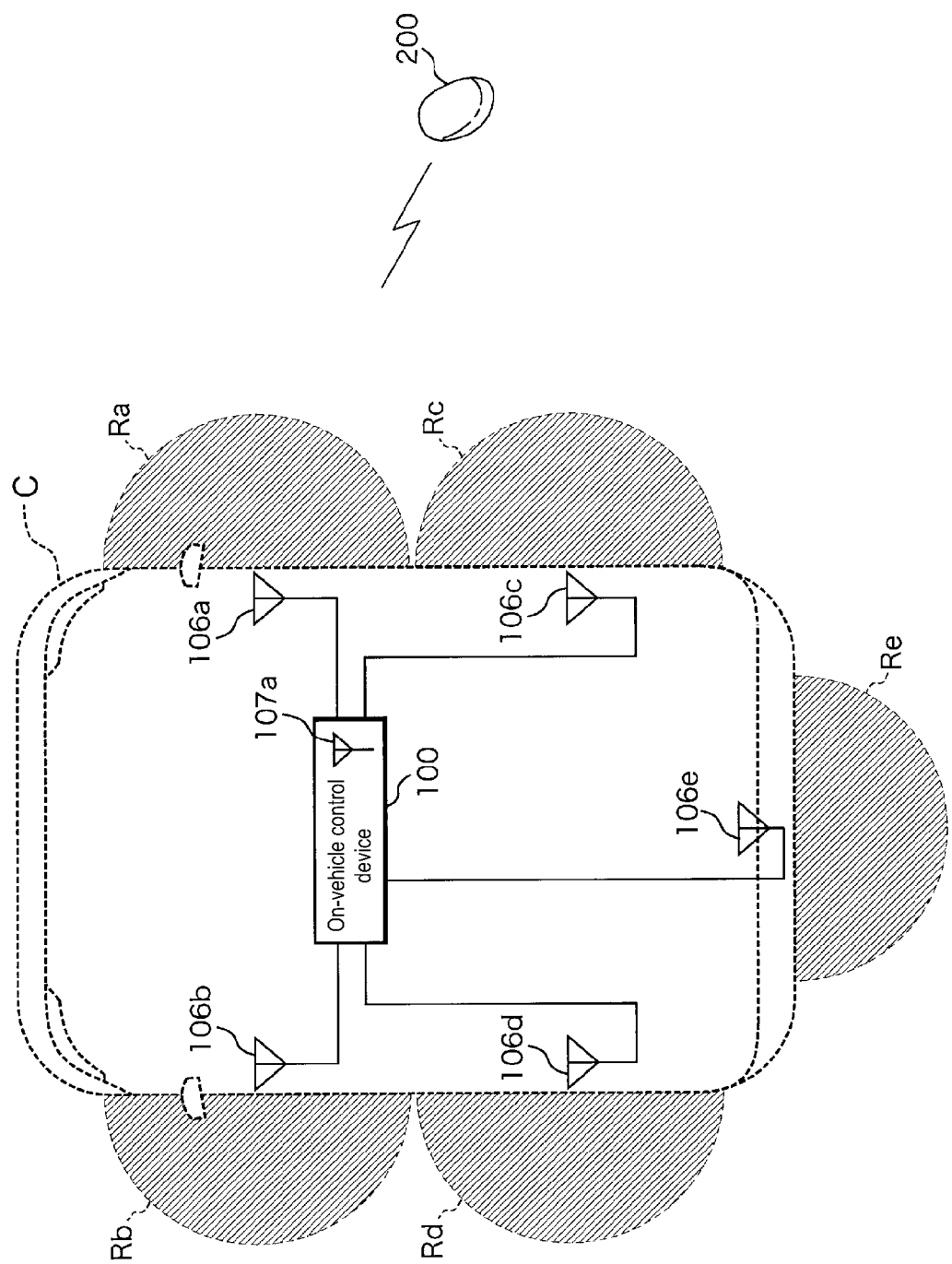
FIG. 1 is a schematic view illustrating the schematic configuration of an on-vehicle control system according to Embodiment 1.

The present disclosure will be described while embodiments are lined up. At least parts of embodiments described below may arbitrarily be combined.

An on-vehicle control device according to one aspect of the present application is an on-vehicle control device including a transmission unit that transmits to a mobile device a response request signal requesting a response in response to operation of instructing a start of a driving source causing a vehicle to drive and an authentication unit that authenticates the mobile device based on a response signal from the mobile device in response to the response request signal, and performing start control of the driving source depending on success or failure of authentication by the authentication unit includes: a determination unit that determines a presence or an absence of unauthorized authentication for the authentication unit; a detection unit that detects an authorized occupant for the vehicle; a start prohibition unit that prohibits the start of the driving source in a case where the determination unit determines that unauthorized authentication is present for the authentication unit; and a start permission unit that permits the start of the driving source regardless of determination by the determination unit in a case where the detection unit detects the occupant.

In the one aspect described above, communication to authenticate the mobile device is made in response to operation of instructing the start of the driving source. When the authorization of the mobile device is successful, control to start the driving source is performed. On the contrary thereto, when the unauthorized authentication such as a relay attack is present, control to prohibit the start of the driving source is performed. Furthermore, in the case where the authorized occupant is detected at the time of performing the start control of the driving source, the start of the driving source is permitted regardless of the determination as to the presence or absence of unauthorized authentication. This avoids the prohibition of the start of the driving source due to erroneous determination.

The on-vehicle control device according to one aspect of the present application further includes a reception unit that receives a control signal transmitted from the mobile device in response to operation instructing unlocking of a door of the vehicle; and an unlocking control unit that performs unlocking control of the door based on the control signal received by the reception unit, and the detection unit determines that the occupant is detected in a case where the door is unlocked by unlocking control by the unlocking control unit.

In the one aspect described above, in the case where the mobile device accepts an operation instructing unlocking, and the vehicle doors are unlocked based on the control signal transmitted from the mobile device, this means that the doors are unlocked by the intention of the authorized occupant for the vehicle, which makes it possible to determine that an occupant is detected.

In the on-vehicle control device according to one aspect of the present application, the determination unit is configured not to perform determination as to the presence or absence of the unauthorized authentication in a case where the detection unit detects the occupant.

In the one aspect described above, in the case where the authorized occupant for the vehicle is detected, determination as to the presence or absence of unauthorized authentication is not performed, which avoids the prohibition of the start of the driving source due to erroneous determination.

In the on-vehicle control device according to one aspect of the present application, the determination unit resumes determination as to the presence or absence of the unauthorized authentication in a case where a predetermined time has elapsed since detection of the occupant by the detection unit.

In the one aspect described above, the determination as to the presence or absence of the unauthorized authentication is resumed in the case where the predetermined time has elapsed since the detection of the authorized occupant for the vehicle. This makes it possible to prohibit the start of the driving source in the case where the unauthorized authentication by a relay attack is detected after the authorized occupant is away from the vehicle.

In the on-vehicle control device according to one aspect of the present application, the determination unit resumes determination as to the presence or absence of the unauthorized authentication in a case where a predetermined operation is accepted after the detection unit detects the occupant.

In the one aspect described above, the determination as to the presence or absence of unauthorized authentication is resumed in the case where the predetermined operation is accepted after detection of the authorized occupant for the vehicle. This makes it possible to prohibit the start of the driving source in the case where the unauthorized authentication by a relay attack is detected after the authorized occupant is away from the vehicle.

In the on-vehicle control device according to one aspect of the present application, the start permission unit permits the start of the driving source when the detection unit detects the occupant even in a case where a determination result of a presence of unauthorized authentication is obtained by the determination unit.

In the one aspect described above, in the case where the occupant for the vehicle is detected, the start of the driving source is permitted even when the determination result of the presence of unauthorized authentication is obtained, which avoids the prohibition of the start of the driving source due to erroneous determination.

An on-vehicle control device according to one aspect of the present application is an on-vehicle control device including a transmission unit that transmits to a mobile device a response request signal requesting a response in response to an operation of instructing a start of a driving source causing a vehicle to drive and an authentication unit that authenticates the mobile device based on a response signal from the mobile device in response to the response request signal, and performing start control of the driving source depending on success or failure of authentication by the authentication unit includes: a detection unit that detects an authorized occupant for the vehicle; a determination unit that determines a presence or an absence of unauthorized authentication for the authentication unit; and a start prohibition unit that prohibits the start of the driving source in a case where the determination unit determines that unauthorized authentication is present for the authentication unit, and the determination unit uses different determination thresholds between a case where the detection unit detects the occupant and a case where the detection unit does not detect the occupant.

In the one aspect described above, the determination threshold can be set so as not to easily determine the presence of the unauthorized authentication when the authorized occupant is detected, which reduces the possibility of erroneously determining the signal transmitted from the mobile device carried by the authorized occupant as a relay attack.

An on-vehicle control method according to one aspect of the present application is an on-vehicle control method of transmitting to a mobile device a response request signal requesting a response in response to operation of instructing a start of a driving source causing a vehicle to drive, executing authentication processing for authenticating the mobile device based on a response signal from the mobile device in response to the response request signal, and performing start control of the driving source depending on success or failure of authentication by the authentication processing includes: determining a presence or an absence of unauthorized authentication for the authentication processing; detecting an authorized occupant for the vehicle; prohibiting the start of the driving source in a case where the presence of unauthorized authentication for the authentication processing is determined; and permitting the start of the driving source regardless of determination as to the presence or absence of the unauthorized authentication in a case where the occupant is detected.

In the one aspect described above, communication to authenticate the mobile device is made in response to operation of instructing the start of the driving source. When the authorization of the mobile device is successful, control to start the driving source is performed. On the contrary thereto, when the unauthorized authentication such as a relay attack is present, control to prohibit the start of the driving source is performed. Furthermore, in the case where the authorized occupant is detected at the time of performing the start control of the driving source, the start of the driving source is permitted regardless of the determination as to the presence or absence of unauthorized authentication. This avoids the prohibition of the start of the driving source due to erroneous determination.

An on-vehicle control method according to one aspect of the present application is an on-vehicle control method of transmitting to a mobile device a response request signal requesting a response in response to operation of instructing a start of a driving source causing a vehicle to drive, executing authentication processing for authenticating the mobile device based on a response signal from the mobile device in response to the response request signal, and performing start control of the driving source depending on success or failure of authentication by the authentication processing includes: detecting an authorized occupant for the vehicle; setting different determination thresholds between a case where the occupant is detected and a case where the occupant is not detected; determining a presence or an absence of unauthorized authentication for the authentication processing by using the determination thresholds set; and prohibiting the start of the driving source in a case where the presence of unauthorized authentication for the authentication processing is determined.

In the one aspect described above, the determination threshold can be set so as not to easily determine the presence of unauthorized authentication when the authorized occupant is detected, which reduces the possibility of erroneously determining the signal transmitted from the mobile device carried by the authorized occupant as a relay attack.

A computer program according to one aspect of the present application is a computer program causing an on-vehicle control device to execute processing of transmitting to a mobile device a response request signal requesting a response in response to operation of instructing a start of a driving source causing a vehicle to drive, executing authentication processing for authenticating the mobile device based on a response signal from the mobile device in response to the response request signal, and performing start control of the driving source depending on success or failure of authentication by the authentication processing, includes: determining a presence or an absence of unauthorized authentication for the authentication processing; detecting an authorized occupant for the vehicle; prohibiting the start of the driving source in a case where the presence of unauthorized authentication for the authentication processing is determined; and permitting the start of the driving source regardless of determination as to the presence or absence of the unauthorized authentication in a case where the occupant is detected.

In the one aspect described above, communication to authenticate the mobile device is made in response to operation of instructing the start of the driving source. When the authorization of the mobile device is successful, control to start the driving source is performed. On the contrary thereto, when the unauthorized authentication such as a relay attack is present, control to prohibit the start of the driving source is performed. Furthermore, in the case where the authorized occupant is detected at the time of performing the start control of the driving source, the start of the driving source is permitted regardless of the determination as to the presence or absence of unauthorized authentication. This avoids the prohibition of the start of the driving source due to erroneous determination.

A computer program according to one aspect of the present application is a computer program causing an on-vehicle control device to execute processing of transmitting to a mobile device a response request signal requesting a response in response to operation of instructing the start of a driving source causing a vehicle to drive, executing authentication processing for authenticating the mobile device based on a response signal from the mobile device in response to the response request signal, and performing start control of the driving source depending on success or failure of authentication by the authentication processing includes: detecting an authorized occupant for the vehicle; setting different determination thresholds between a case where the occupant is detected and a case where the occupant is not detected; determining a presence or an absence of unauthorized authentication for the authentication processing by using the determination thresholds set; and prohibiting the start of the driving source in a case where the presence of unauthorized authentication for the authentication processing is determined.

In the one aspect described above, the determination threshold can be set so as not to easily determine the presence of unauthorized authentication when the authorized occupant is detected, which reduces the possibility of erroneously determining the signal transmitted from the mobile device carried by the authorized occupant as a relay attack.

The present disclosure will be described in detail below with reference to the drawings depicting embodiments.

Embodiment 1

FIG. 1 is a schematic view illustrating the schematic configuration of an on-vehicle control system according to Embodiment 1. The on-vehicle control system according to Embodiment 1 includes an on-vehicle control device 100 mounted on a vehicle C and a mobile device 200 carried by an occupant.

The on-vehicle control device 100 is an electronic controller unit (ECU), for example, and collectively performs control related to operation of the engine provided in the vehicle C, control related to locking and unlocking of the vehicle doors, etc.

The on-vehicle control device 100 is provided with a plurality of LF transmission antennas 106a-106e and an RF reception antenna 107a in order to perform radio communication with the mobile device 200. The LF transmission antennas 106a-106e are antennas provided around the respective vehicle doors or within the respective tire houses provided in the vehicle C, for example, and transmit signals having a frequency in an LF band (hereinafter also referred to as an LF signal). The LF transmission antennas 106a-106e are provided, for example, around the vehicle doors for the occupant's seat, the passenger seat, the right rear seat, the left rear seat and around the back door or provided within the respective tire houses. Arrival ranges of signals transmitted from the LF transmission antennas 106a-106e to the mobile device 200 are respectively represented as communicable ranges Ra-Re in FIG. 1. The RF reception antenna 107a is an antenna integrated in the on-vehicle control device 100, for example, and receives a signal having a frequency in the RF band (hereinafter also referred to as an RF signal).

Figure 3:
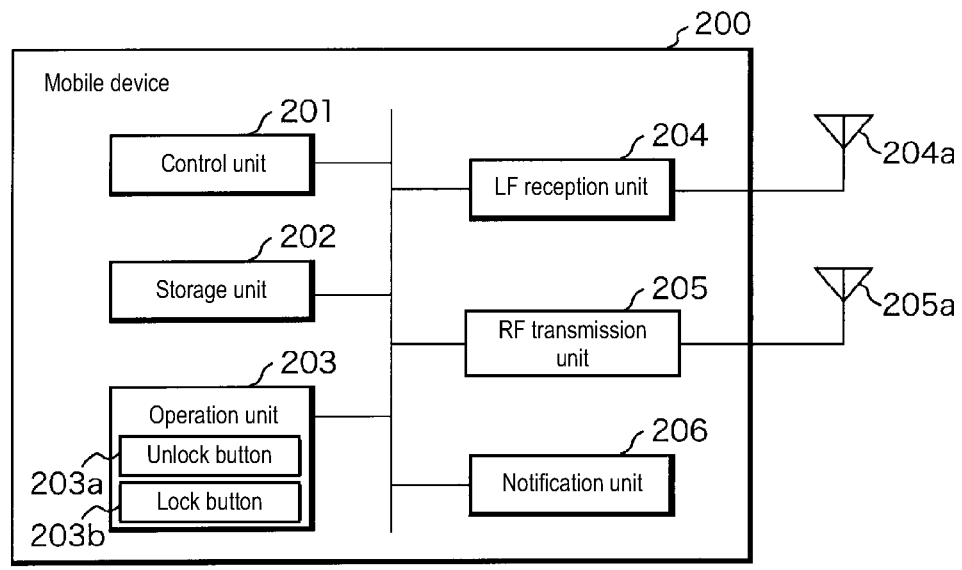
FIG. 3 is a block diagram illustrating the internal configuration of a mobile device.

The mobile device 200 is provided with an LF reception antenna 204a and an RF transmission antenna 205a in order to perform radio communication with the on-vehicle control device 100 mounted on the vehicle C(see FIG. 3). The LF reception antenna 204a is an antenna integrated in the mobile device 200 and receives an LF signal transmitted from the on-vehicle control device 100. Meanwhile, the RF transmission antenna 205a is an antenna integrated in the mobile device 200 and transmits, when receiving an LF signal transmitted from the on-vehicle control device 100, an RF signal as a response signal to the on-vehicle control device 100, for example.

In such a communication system for a vehicle between the on-vehicle control device 100 and the mobile device 200, the communication range of radio communication using an RF signal is approximately several tens of meters while the communication range of radio communication using an LF signal is approximately several meters. The situation where an LF signal transmitted from the on-vehicle control device 100 is received by the mobile device 200 and an RF signal is transmitted from the mobile device 200 as a response signal essentially occurs only when an occupant carrying an authorized mobile device 200 is present inside or near the vehicle C.

However, by using a relay device that relays an LF signal transmitted from the on-vehicle control device 100 to the mobile device 200 and an RF signal transmitted from the mobile device 200 to the on-vehicle control device 100, communication between the on-vehicle control device 100 and the mobile device 200 is made possible even when the occupant carrying the mobile device 200 is away from the vehicle C. In the case where communication causing the on-vehicle control device 100 to improperly authenticate the mobile device 200 occurs due to such a relay attack and the mobile device 200 is improperly authenticated, there is a possibility of a malicious third party starting the engine.

Hereupon, the on-vehicle control device 100 according to the present embodiment determines the presence or absence of unauthorized authentication based on the signal strength or the like of an RF signal received by the RF reception antenna 107a, for example. When determining that the unauthorized authentication is present, the on-vehicle control device 100 prohibits the start of the engine to thereby avoid the malicious third party starting the engine.

Meanwhile, in the case where the on-vehicle control device 100 performs erroneous determination at the time of receiving an RF signal transmitted from the mobile device 200 carried by an authorized occupant for the vehicle C, it is determined that the unauthorized authentication is present even when the mobile device 200 is authorized according to an authorized procedure, and the start of the engine is prohibited. Hereupon, in the present embodiment, in the case where the presence of the authorized occupant for the vehicle C is detected by the on-vehicle control device 100, the start of the engine is permitted regardless of determination as to the presence or absence of the unauthorized authentication.

Figure 2:
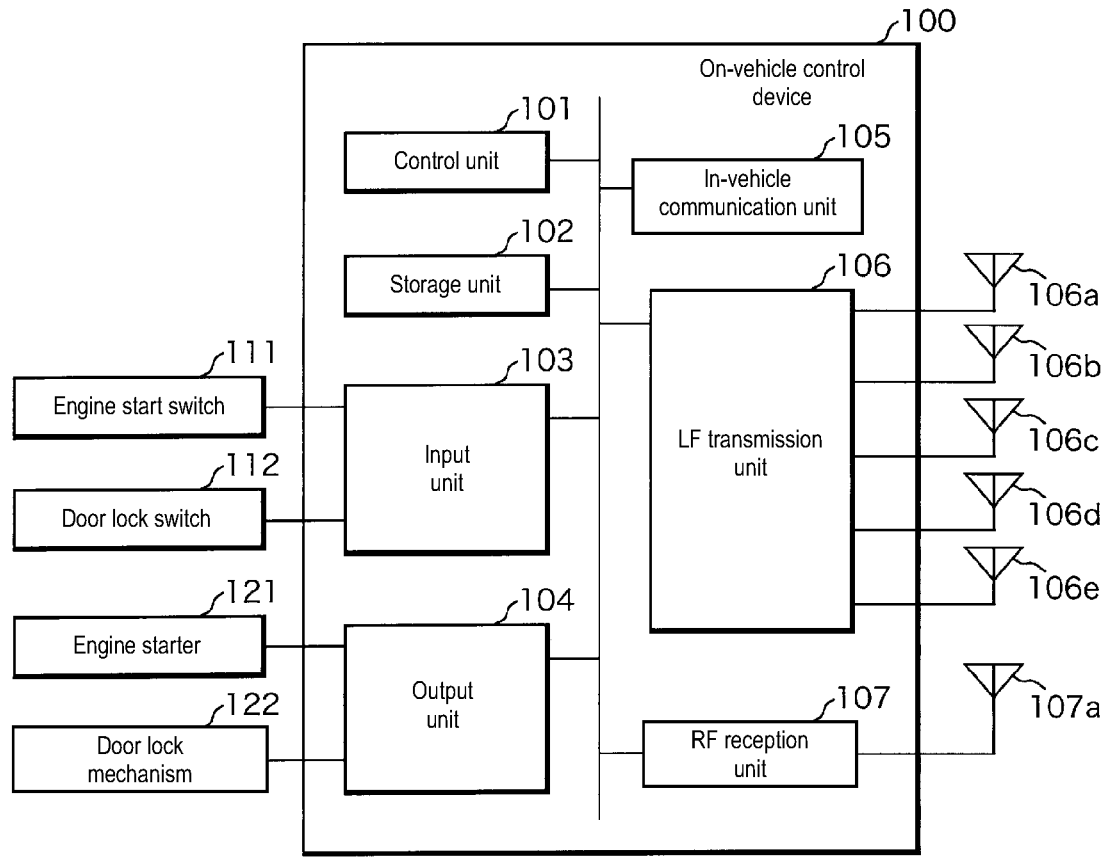
FIG. 2 is a block diagram illustrating the internal configuration of an on-vehicle control device.

FIG. 2 is a block diagram illustrating the internal configuration of the on-vehicle control device 100. The on-vehicle control device 100 is provided with a control unit 101, a storage unit 102, an input unit 103, an output unit 104, an in-vehicle communication unit 105, an LF transmission unit 106 and an RF reception unit 107.

The control unit 101 includes, for example, a central processing unit (CPU), a read only memory (ROM), a random access memory (RAM) and the like. The CPU within the control unit 101 controls the operation of the above-mentioned hardware provided in the on-vehicle control device 100 by executing a control program stored in the ROM to cause the entire equipment as the on-vehicle control device according to the present application. The RAM in the control unit 101 stores various data generated while the control program is being executed.

Note that the control unit 101, though not limited to the above-described configuration, may essentially be one or more processing circuits including a single-core CPU, a multi-core CPU, a microcomputer, a volatile or nonvolatile memory, etc. Furthermore, the control unit 101 may have functions as a clock for outputting date and time information, a timer for measuring an elapsed time from issuance of an instruction for starting measurement to issuance of an instruction for ending the measurement, a counter for counting the number or the like.

The storage unit 102 is formed of a nonvolatile memory such as an electronically erasable programmable read only memory (EEPROM), for example and stores various information. Here, the various information stored in the storage unit 102 include authentication information such as the identifier (ID) of the vehicle C mounted with the on-vehicle control device 100, the ID of the mobile device 200 as a communication partner, key information used for encryption processing, etc.

The input unit 103 is provided with an interface to which a request switch such as an engine start switch 111, a door lock switch 112 or the like is connected.

The engine start switch 111 is a request switch for accepting operation of instructing the start of the engine provided in the vehicle C and is provided in a console in the vehicle interior. The door lock switch 112 is a request switch for accepting an instruction related to locking or unlocking of the vehicle doors and is provided in a key cylinder, a door handle or the like provided in the vehicle door for the occupant's seat. Note that these request switches may be mechanical switches or may be switches provided with sensors for detecting operation by the occupant in a contacting or noncontacting manner.

The output unit 104 is provided with an interface to which an engine starter 121, a door lock mechanism 122, etc. are connected.

The engine starter 121 is a start device for starting the engine of the vehicle C. The door lock mechanism 122 is provided with a mechanical mechanism for locking and unlocking the vehicle doors of the vehicle C, an actuator for electrically operating this mechanical mechanism, etc.

The in-vehicle communication unit 105 is provided with a controller area network (CAN) communication interface, for example and is connected to another ECU provided in the vehicle C via the CAN bus. The in-vehicle communication unit 105 transmits and receives data with another ECU (not illustrated) according to the CAN protocol.

The LF transmission unit 106 is provided with a signal generation circuit for generating an LF signal based on a signal output from the control unit 101, an amplifier circuit for amplifying the generated signal, etc. and transmits the amplified signal to the outside through the LF transmission antennas 106a-106e. The LF transmission unit 106 transmits detection signals (LF signals) for detecting the mobile device 200, for example, through the LF transmission antennas 106a-106e according to an instruction from the control unit 101. Here, it is assumed that the authentication information stored in the storage unit 102 is added to the LF signal transmitted from the LF transmission unit 106.

The RF reception unit 107 is connected to the RF reception antenna 107a and is provided with a reception circuit or the like for receiving an RF signal through the RF reception antenna 107a. In the present embodiment, the RF reception unit 107 sends out the RF signal received through the RF reception antenna 107a to the control unit 101. The received RF signal includes authentication information added by a transmission source (mobile device 200, for example), and by the use of the authentication information, the determination as to whether or not the transmission source is authenticated is made possible.

When accepting operation of the engine start switch 111 through the input unit 103, the control unit 101 of the on-vehicle control device 100 outputs a signal for requesting a response (response request signal) to the mobile device 200 from the LF transmission unit 106 and transmits the signal as an LF signal through the LF transmission antennas 106a-106e. When receiving an RF signal (response signal) as a response to the response request signal through the RF reception antenna 107a, the control unit 101 of the on-vehicle control device 100 authenticates the transmission source (mobile device 200) based on the authentication information included in the RF signal. When authenticating the mobile device 200, the control unit 101 performs control to start the engine of the vehicle C by outputting a control signal to the engine starter 121 through the output unit 104. Similarly, in the case where the control unit 101 accepts operation of the door lock switch 112 through the input unit 103, receives an RF signal in response to the LF signal transmitted from the LF transmission unit 106, and authenticates the transmission source (mobile device 200) based on the authentication information included in the received RF signal, it performs control to unlock the vehicle doors by outputting a control signal to the door lock mechanism 122 through the output unit 104.

In the present embodiment, though the on-vehicle control device 100 is configured to control the start of the engine, it may be configured to control the start of a driving battery when the vehicle C is equipped with a driving battery system in place of the engine as a driving source. Moreover, in the present embodiment, though the on-vehicle control device 100 is configured to execute control related to the start of the engine and the locking and unlocking of the vehicle doors for the sake of simplicity, the on-vehicle control device 100 may be configured to connect an engine ECU for performing control related to the start of the engine and an door lock ECU for performing control related to locking and unlocking of the vehicle doors to the in-vehicle communication unit 105 and to execute control through these engine ECU and door lock ECU.

FIG. 3 is a block diagram illustrating the internal configuration of the mobile device 200. The mobile device 200 is provided with a control unit 201, a storage unit 202, an operation unit 203, an LF reception unit 204, an RF transmission unit 205 and a notification unit 206.

The control unit 201 includes, for example, a CPU, a ROM, etc. The CPU within the control unit 201 controls the operation of the hardware provided in the mobile device 200 by executing a control program stored in the ROM and causes the entire equipment as the mobile device according to the present application. It is noted that the control unit 201 may have functions as a timer for measuring an elapsed time from issuance of an instruction for starting measurement to issuance of an instruction for ending the measurement, a counter for counting the number, or the like.

The storage unit 202 is formed of a nonvolatile memory such as an EEPROM or the like and stores various information. Here, the various information stored in the storage unit 202 include authentication information such as the ID of the mobile device 200, the ID of a vehicle C mounted with the on-vehicle control device 100 as a communication partner, key information used for encryption processing, etc.

The operation unit 203 is provided with an interface for accepting operation by the occupant. In the present embodiment, the operation unit 203 is provided with an unlock button 203a to be operated when the doors of the vehicle C are unlocked and a lock button 203b to be operated when the doors of the vehicle C are locked. When the unlock button 203a (or the lock button 203b) is operated by the occupant, the operation unit 203 outputs a signal indicating that the unlock button 203a (or the lock button 203b) is operated to the control unit 201. When receiving the signal indicating that the unlock button 203a (or the lock button 203b) is operated, the control unit 201 sends out a control signal to instruct unlocking (or locking) of the doors of the vehicle C to the RF transmission unit 205.

The LF reception unit 204, which is connected to the LF reception antenna 204a, is provided with a reception circuit for receiving an LF signal through the LF reception antenna 204a, a measurement circuit for measuring the signal strength of the received signal and obtaining a received signal strength indicator (RSSI) and the like. When receiving a detection signal transmitted from the on-vehicle control device 100, the LF reception unit 204 obtains the RSSI of the received detection signal and sends out the received detection signal as well as the obtained RSSI to the control unit 201. The control unit 201 executes processing of authenticating the on-vehicle control device 100 as a transmission source when obtaining the detection signal and the RSSI, and executes processing of transmitting an RF signal by the RF transmission unit 205 as a response when the detection signal is from an authorized on-vehicle control device 100. At this time, the control unit 201 performs processing of outputting the RSSI and the authentication information to the RF transmission unit 205 in order to add the RSSI of the detection signal and the authentication information of the mobile device 200 to the RF signal to be transmitted by the RF transmission unit 205.

The RF transmission unit 205 is provided with a signal generation circuit for generating an RF signal including an RSSI and authentication information based on the instruction from the control unit 201, an amplifier circuit for amplifying the generated signal, etc. and transmits the amplified signal to the outside through the RF transmission antenna 205a.

The notification unit 206 is provided with a light emitting diode (LED), for example, and notifies information reported from the on-vehicle control device 100 by emitting light in response to the signal transmitted from the on-vehicle control device 100. Alternatively, the notification unit 206 may be configured to be provided with a vibration element, for example and notify information reported from the on-vehicle control device 100 by vibrating the mobile device 200 in response to the signal transmitted from the on-vehicle control device 100. Alternatively, the notification unit 206 may be configured to be provided with a display unit for displaying character information.

The processing procedure executed by the on-vehicle control device 100 will be described below.

Figure 4:
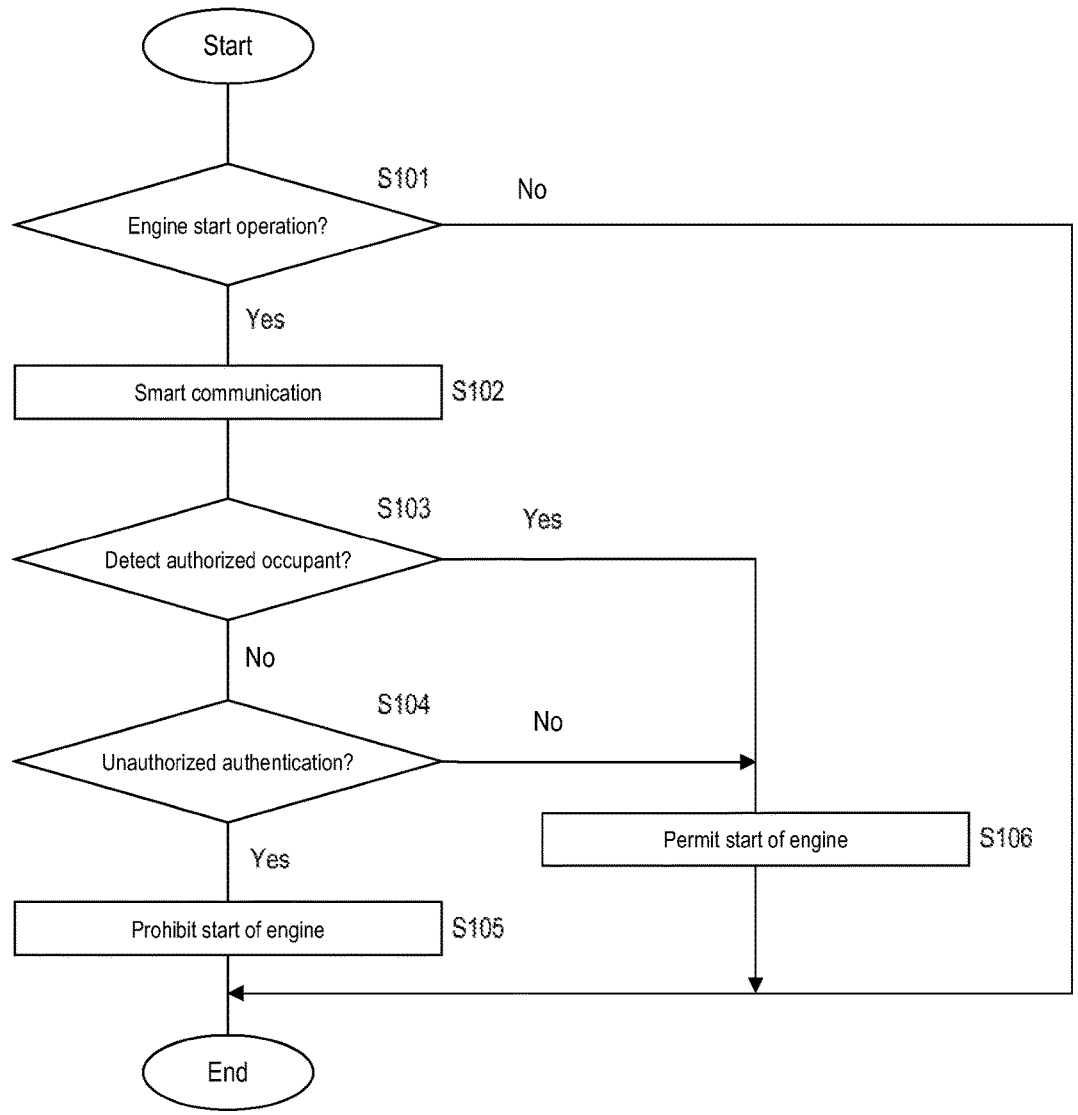
FIG. 4 is a flowchart showing a processing procedure executed by the on-vehicle control device according to Embodiment 1.

FIG. 4 is a flowchart showing a processing procedure executed by the on-vehicle control device 100 according to Embodiment 1. The on-vehicle control device 100 executes the following processing at a regular timing, for example. The control unit 101 first determines the presence or absence of engine start operation (step S101). More specifically, the control unit 101 determines whether or not a signal indicating that the engine start switch 111 is operated is input through the input unit 103. When the engine start operation is absent (S101: NO), the control unit 101 ends the processing according to this flowchart.

When the engine start operation is present (S101: YES), the control unit 101 conducts smart communication (step S102). More specifically, the control unit 101 outputs to the mobile device 200 a response request signal for requesting a response from the LF transmission unit 106 and transmits the signal as an LF signal to the outside of the vehicle C through the LF transmission antennas 106a-106e. Furthermore, the control unit 101 receives a response signal (RF signal) transmitted from the mobile device 200 having received the response request signal through the RF reception unit 107. The response signal transmitted from the mobile device 200 includes the authentication information, and the control unit 101 authenticates the mobile device 200 based on the authentication information.

Next, the control unit 101 determines whether or not an authorized occupant is detected (step S103). For example, when unlocking operation (keyless entry) of the vehicle doors is established by remote control using the mobile device 200, the control unit 101 can determine that the authorized occupant is detected. In the keyless entry, the control unit 101 receives by the RF reception unit 107 an RF signal transmitted when pressing operation of the unlock button 203a is performed at the operation unit 203 of the mobile device 200. The received RF signal includes the authentication information, and thus, the control unit 101 can authenticate the transmission source of the RF signal based on the authentication information. When the authentication is established, the control unit 101 outputs a control signal for unlocking the vehicle doors from the output unit 104 to the door lock mechanism 122 to unlock the vehicle doors.

In the present embodiment, though the presence of the authorized occupant is indirectly detected by unlocking operation of the vehicle doors using the mobile device 200, the detection method of the authorized occupant is not limited to the above description. For example, in the case where the mobile device 200 is provided with an answer back button to confirm the position of the vehicle C, the presence of the authorized occupant may be detected by receiving a signal transmitted from the mobile device 200 when the answer back button is operated. Furthermore, a read-out unit to read out biometric information of an occupant such as fingerprint information or the like is provided in the engine start switch 111, whereby the authorized occupant may be detected based on the read biometric information.

When the authorized occupant is not detected (S103: NO), the control unit 101 determines the presence or absence of unauthorized authentication in the smart communication (step S104). Here, the control unit 101 determines the presence or absence of the unauthorized authentication of the mobile device 200 using a relay attack by employing the well-known method. For example, the control unit 101 can determine the presence or absence of the unauthorized authentication based on the difference between the signal strength of an RF signal directly received from the mobile device 200 and the signal strength of an RF signal received via the relay device.

When determining that the unauthorized authentication is present (S104: YES), the control unit 101 prohibits the start of the engine (step S105). In this case, the control unit 101 ends the processing according to this flowchart without outputting a control signal for controlling the operation of the engine starter 121.

On the contrary, when determining that the unauthorized authentication is absent at step S104 (S104: NO), the control unit 101 permits the start of the engine (step S106). In this case, the control unit 101 outputs a control signal for controlling the operation of the engine starter 121 from the output unit 104 to start the engine of the vehicle C.

Additionally, when determining that the authorized occupant is detected (S103: YES) at step S103, the control unit 101 permits the start of the engine (step S106). In other words, the control unit 101 outputs a control signal for controlling the operation of the engine starter 121 from the output unit 104 to start the engine of the vehicle C.

From the above, in the present embodiment, in the case where an authenticated occupant is detected at the time of performing start control of the engine through the smart communication, the presence or absence of unauthorized authentication is not determined, which avoids the prohibition of the start of the engine due to erroneous detection.

Embodiment 2

In Embodiment 2, described is a configuration in which determination as to the presence or absence of unauthorized authentication is resumed when a set time has elapsed since the detection of an authorized occupant. The entire configuration of an on-vehicle control system and the internal configuration of an on-vehicle control device 100 and a mobile device 200 in Embodiment 2 are the same as those in Embodiment 1 and the description thereof will not be made.

Figure 5:
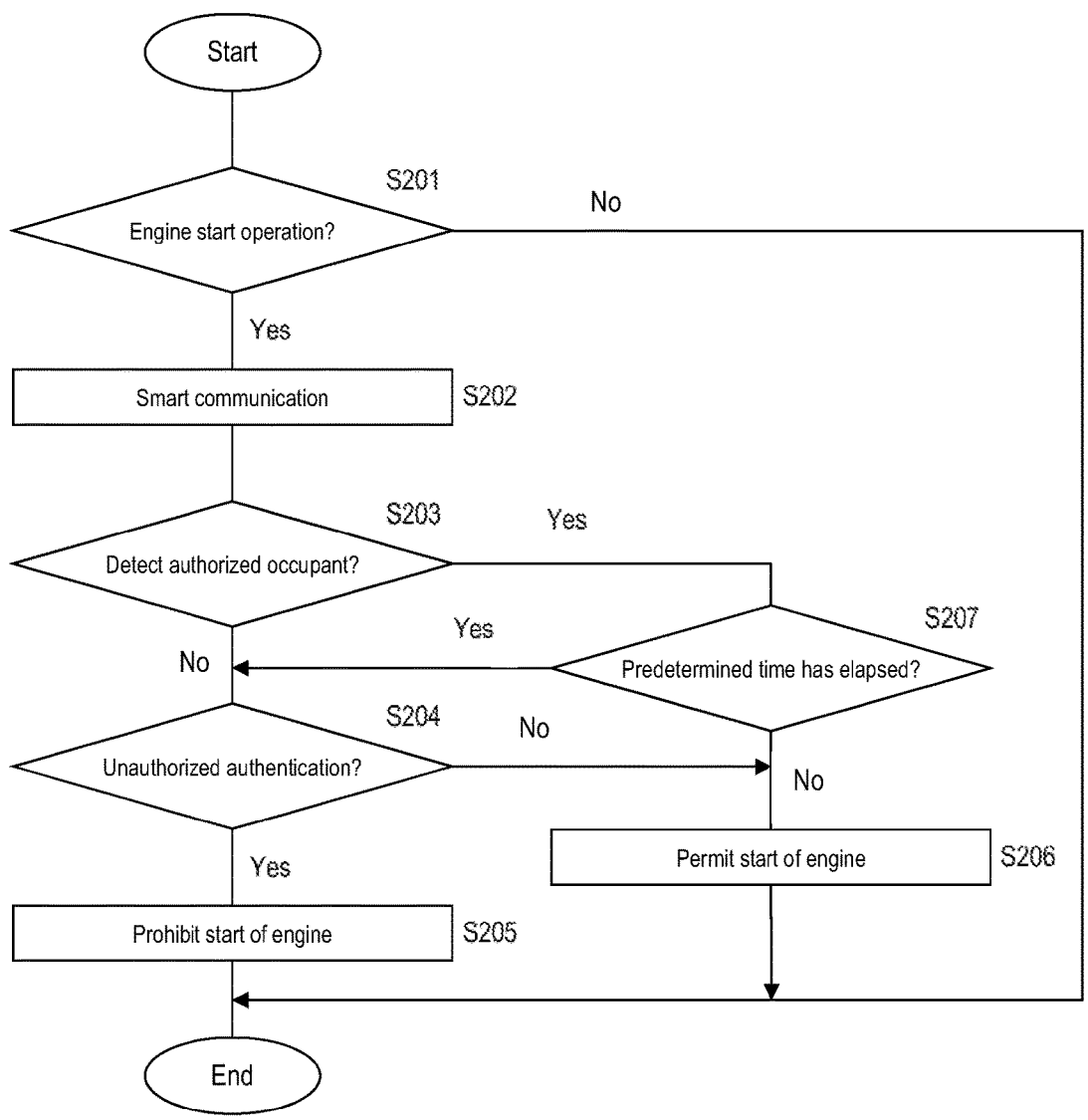
FIG. 5 is a flowchart showing a processing procedure executed by an on-vehicle control device according to Embodiment 2.

FIG. 5 is a flowchart showing a processing procedure executed by the on-vehicle control device 100 according to Embodiment 2. The on-vehicle control device 100 executes the following processing at a regular timing, for example. The control unit 101 first determines the presence or absence of engine start operation (step S201). More specifically, the control unit 101 determines whether or not a signal indicating that the engine start switch 111 is operated is input through the input unit 103. When the engine start operation is absent (S201: NO), the control unit 101 ends the processing according to this flowchart.

When the engine start operation is present (S201: YES), the control unit 101 conducts smart communication (step S202). More specifically, the control unit 101 outputs to the mobile device 200 a response request signal for requesting a response from the LF transmission unit 106 and transmits the signal as an LF signal to the outside of the vehicle C through the LF transmission antennas 106a-106e. Furthermore, the control unit 101 receives a response signal (RF signal) transmitted from the mobile device 200 having received the response request signal through the RF reception unit 107. The response signal transmitted from the mobile device 200 includes the authentication information, and thus the control unit 101 authenticates the mobile device 200 based on the authentication information.

Next, the control unit 101 determines whether or not an authorized occupant is detected (step S203). As described above, it is possible to determine that the authorized occupant is detected in the case where a signal is received that is transmitted from the mobile device 200 when the unlocking operation (keyless entry) of the vehicle doors is established or when the answer back button is operated, in the case where the biometric information of the authorized occupant is read out, or the like.

When the authorized occupant is not detected (S203: NO), the control unit 101 determines the presence or absence of unauthorized authentication in the smart communication (step S204). Here, the control unit 101 determines the presence or absence of the unauthorized authentication of the mobile device 200 using a relay attack by employing the well-known method. For example, the control unit 101 can determine the presence or absence of the unauthorized authentication based on the difference between the signal strength of an RF signal directly received from the mobile device 200 and the signal strength of an RF signal received via the relay device.

When determining that the unauthorized authentication is present (S204: YES), the control unit 101 prohibits the start of the engine (step S205). In this case, the control unit 101 ends the processing according to this flowchart without outputting a control signal for controlling the operation of the engine starter 121.

On the contrary, when determining that the unauthorized authentication is absent at step S204 (S204: NO), the control unit 101 permits the start of the engine (step S206). In this case, the control unit 101 outputs a control signal for controlling the operation of the engine starter 121 from the output unit 104 to start the engine of the vehicle C.

When determining that the authorized occupant is detected at step S203 (step S203: YES), the control unit 101 determines whether or not a predetermined time (5 minutes, for example) has elapsed since the detection of the authorized occupant (step S207). When determining that the predetermined time has elapsed (S207: YES), the control unit 101 shifts the processing to step S204 to resume the determination as to the presence or absence of the unauthorized authentication.

On the contrary, when determining that the predetermined time has not elapsed (S207: NO), the control unit 101 permits the start of the engine (step S206). In other words, the control unit 101 outputs a control signal for controlling the operation of the engine starter 121 from the output unit 104 to start the engine of the vehicle C.

From the above, in the present embodiment, the determination as to the presence or absence of the unauthorized authentication is resumed in the case where the predetermined time has elapsed since the detection of the occupant, which can prohibit the start of the driving source in the case where the unauthorized authentication by a relay attack is detected.

Embodiment 3

In Embodiment 3, described is a configuration in which determination as to the presence or absence of unauthorized authentication is resumed in the case where predetermined operation is accepted after the detection of an authorized occupant.

The entire configuration of an on-vehicle control system and the internal configuration of an on-vehicle control device 100 and a mobile device 200 in Embodiment 3 are the same as those in Embodiment 1, and the description thereof will not be made.

Figure 6:
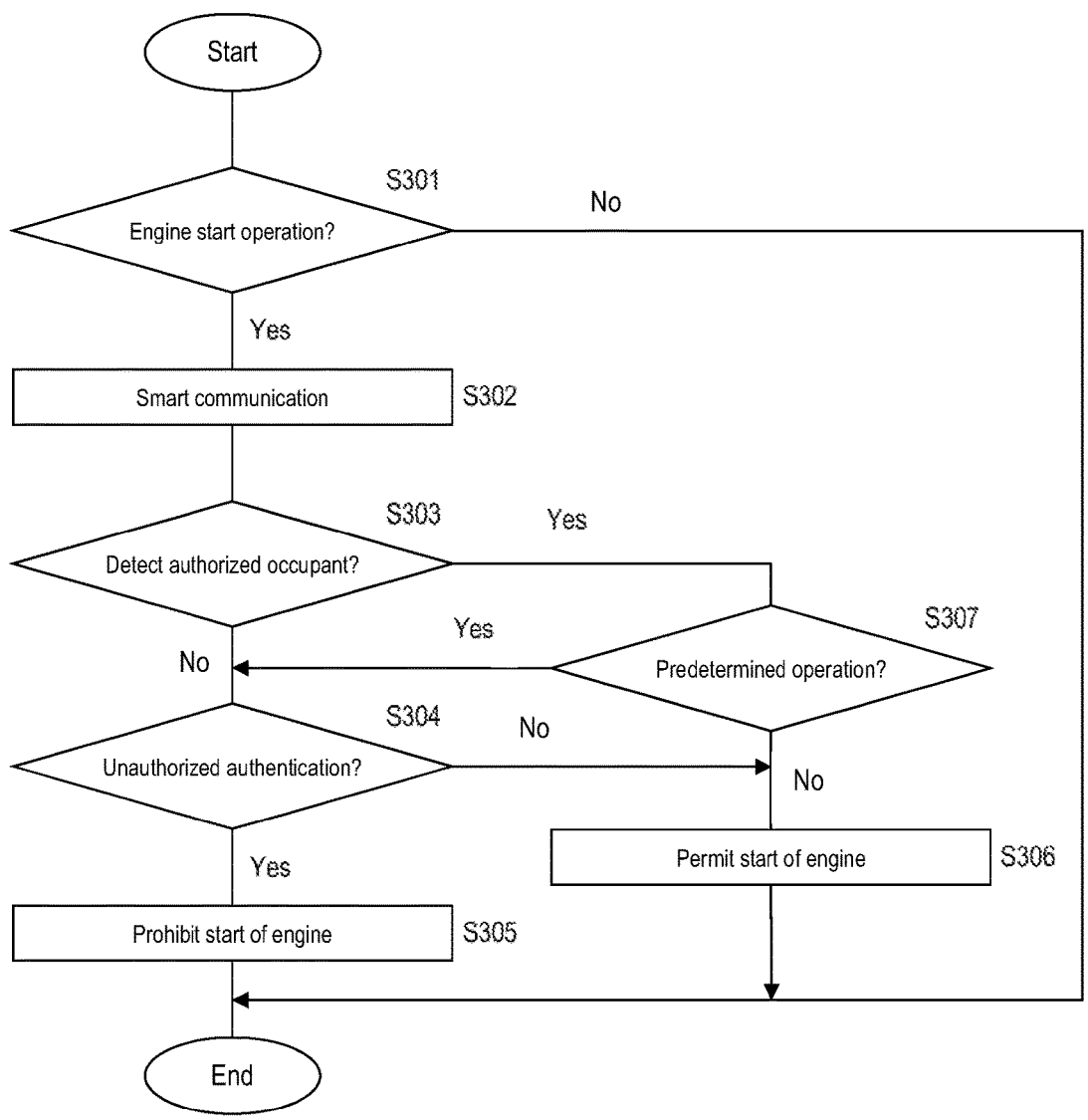
FIG. 6 is a flowchart showing a processing procedure executed by an on-vehicle control device according to Embodiment 3.

FIG. 6 is a flowchart showing a processing procedure executed by the on-vehicle control device 100 according to Embodiment 3. The on-vehicle control device 100 executes the following processing at a regular timing, for example. The control unit 101 first determines the presence or absence of engine start operation (step S301). More specifically, the control unit 101 determines whether or not a signal indicating that the engine start switch 111 is operated is input through the input unit 103. When the engine start operation is absent (S301: NO), the control unit 101 ends the processing according to this flowchart.

When the engine start operation is present (S301: YES), the control unit 101 conducts smart communication (step S302). More specifically, the control unit 101 outputs to the mobile device 200 a response request signal for requesting a response from the LF transmission unit 106 and transmits the signal as an LF signal to the outside of the vehicle C through the LF transmission antennas 106a-106e. Furthermore, the control unit 101 receives a response signal (RF signal) transmitted from the mobile device 200 having received the response request signal through the RF reception unit 107. The response signal transmitted from the mobile device 200 includes the authentication information, and thus the control unit 101 authenticates the mobile device 200 based on the authentication information.

Next, the control unit 101 determines whether or not an authorized occupant is detected (step S303). As described above, it is possible to determine that the authorized occupant is detected in the case where a signal is received that is transmitted from the mobile device 200 when the unlocking operation (keyless entry) of the vehicle doors is established or when the answer back button is operated, in the case where the biometric information of the authorized occupant is read out, or the like.

When the authorized occupant is not detected (S303: NO), the control unit 101 determines the presence or absence of unauthorized authentication in the smart communication (step S304). Here, the control unit 101 determines the presence or absence of the unauthorized authentication of the mobile device 200 using a relay attack by employing the well-known method. For example, the control unit 101 can determine the presence or absence of the unauthorized authentication based on the difference between the signal strength of an RF signal directly received from the mobile device 200 and the signal strength of an RF signal received via the relay device.

When determining that the unauthorized authentication is present (S304: YES), the control unit 101 prohibits the start of the engine (step S305). In this case, the control unit 101 ends the processing according to this flowchart without outputting a control signal for controlling the operation of the engine starter 121.

On the contrary, when determining that the unauthorized authentication is absent at step S304 (S304: NO), the control unit 101 permits the start of the engine (step S306). In this case, the control unit 101 outputs a control signal for controlling the operation of the engine starter 121 from the output unit 104 to start the engine of the vehicle C.

When determining that the authorized occupant is detected at step S303 (step S303: YES), the control unit 101 determines whether or not predetermined operation is accepted (step S307). The operation as a target for determination is a predetermined operation to be performed on the vehicle C and includes, for example, locking operation of the vehicle doors using the mechanical key, operation of the lock button 203b to lock the vehicle doors using the mobile device 200, etc. When determining that the predetermined operation is accepted (S307: YES), the control unit 101 shifts the processing to step S304 to resume the determination as to the presence or absence of the unauthorized authentication.

On the contrary, when determining that the predetermined operation is not accepted (S307: YES), the control unit 101 permits the start of the engine (step S306). In other words, the control unit 101 outputs a control signal for controlling the operation of the engine starter 121 from the output unit 104 to start the engine of the vehicle C.

From the above, in the present embodiment, the determination as to the presence or absence of the unauthorized authentication is resumed in the case where the predetermined operation is accepted after the occupant is detected, which can prohibit the start of the driving source when the unauthorized authentication by a relay attack is detected.

Embodiment 4

In Embodiment 4, described is a configuration in which the start of the engine is permitted regardless of the result of the determination as to the presence or absence of unauthorized authentication in the case where an authorized occupant is detected at the time of controlling the start of the engine through the smart communication.

The entire configuration of an on-vehicle control system and the internal configuration of an on-vehicle control device 100 and a mobile device 200 in Embodiment 4 are the same as those in Embodiment 1, and the description thereof will not be made.

Figure 7:
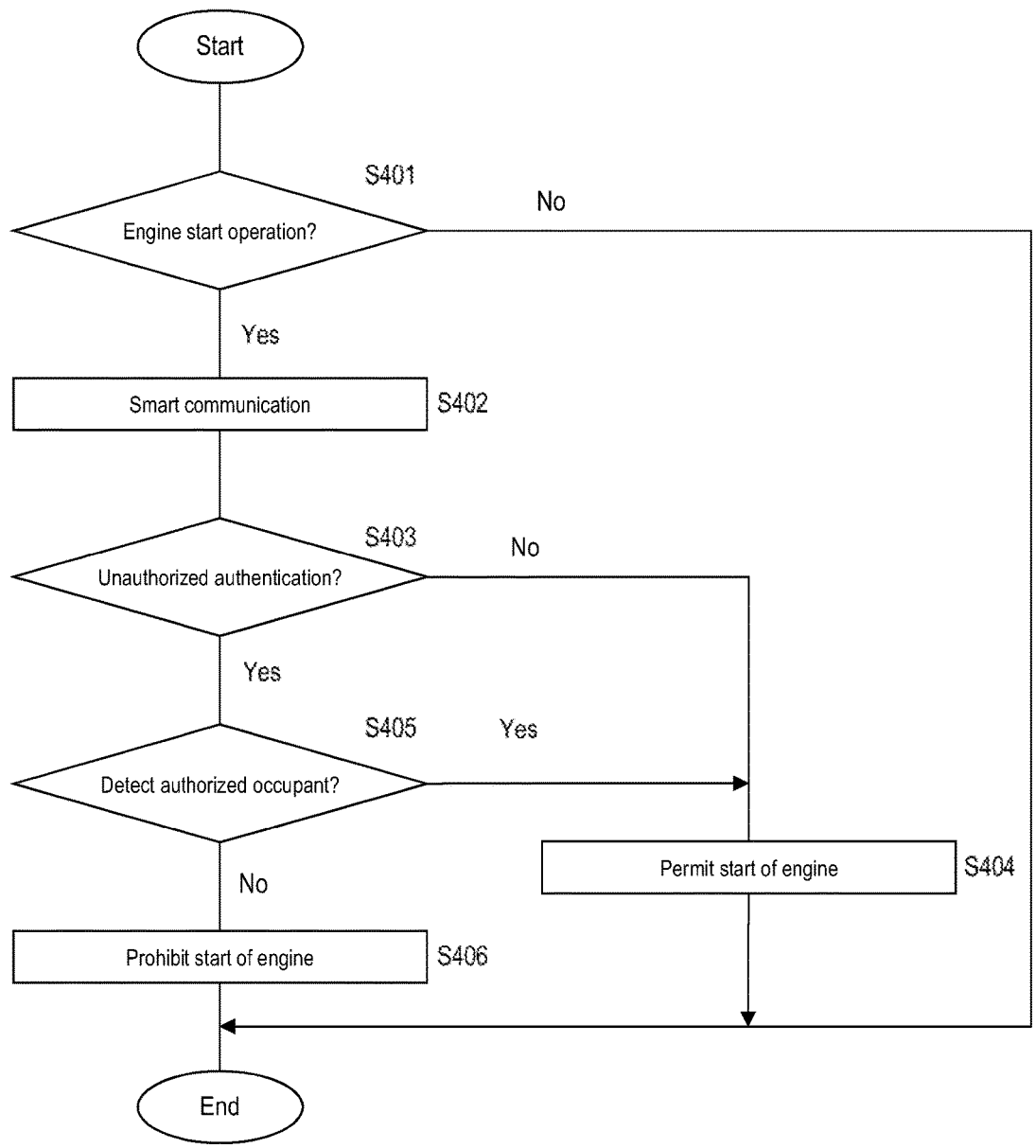
FIG. 7 is a flowchart showing a processing procedure executed by an on-vehicle control device according to Embodiment 4.

FIG. 7 is a flowchart showing a processing procedure executed by the on-vehicle control device 100 according to Embodiment 4. The on-vehicle control device 100 executes the following processing at a regular timing, for example. The control unit 101 first determines the presence or absence of engine start operation (step S401). More specifically, the control unit 101 determines whether or not a signal indicating that the engine start switch 111 is operated is input through the input unit 103. When the engine start operation is absent (S401: NO), the control unit 101 ends the processing according to this flowchart.

When the engine start operation is present (S401: YES), the control unit 101 conducts smart communication (step S402). More specifically, the control unit 101 outputs to the mobile device 200 a response request signal for requesting a response from the LF transmission unit 106 and transmits the signal as an LF signal to the outside of the vehicle C through the LF transmission antennas 106a-106e. Furthermore, the control unit 101 receives a response signal (RF signal) transmitted from the mobile device 200 having received the response request signal through the RF reception unit 107. The response signal transmitted from the mobile device 200 includes the authentication information, and thus the control unit 101 authenticates the mobile device 200 based on the authentication information.

Next, the control unit 101 determines the presence or absence of unauthorized authentication in the smart communication (step S403). Here, the control unit 101 determines the presence or absence of the unauthorized authentication of the mobile device 200 using a relay attack by employing the well-known method. For example, the control unit 101 can determine the presence or absence of the unauthorized authentication based on the difference between the signal strength of an RF signal directly received from the mobile device 200 and the signal strength of an RF signal received via the relay device.

When determining that the unauthorized authentication is absent at step S403 (S403: NO), the control unit 101 permits the start of the engine (step S404). In this case, the control unit 101 outputs a control signal for controlling the operation of the engine starter 121 from the output unit 104 to start the engine of the vehicle C.

When determining that the unauthorized authentication is present at step S403 (S403: YES), the control unit 101 determines whether or not an authorized occupant is detected (step S405). As described above, it is possible to determine that the authorized occupant is detected in the case where a signal is received that is transmitted from the mobile device 200 when the unlocking operation (keyless entry) of the vehicle doors is established or when the answer back button is operated, in the case where the biometric information of the authorized occupant is read out, or the like.

When the authorized occupant is not detected (S405: NO), the control unit 101 prohibits the start of the engine (step S406). In this case, the control unit 101 ends the processing according to this flowchart without outputting a control signal for controlling the operation of the engine starter 121.

On the contrary, when determining that the authorized occupant is detected at step S405 (S405: YES), the control unit 101 permits the start of the engine (step S404). In other words, the control unit 101 outputs a control signal for controlling the operation of the engine starter 121 from the output unit 104 to start the engine of the vehicle C.

From the above, in the present embodiment, the start of the engine is permitted when the presence of the authorized occupant is detected even in the case where the unauthorized authentication is detected, which avoids the prohibition of the start of the engine due to erroneous detection.

Embodiment 5

In Embodiment 5, described is a configuration in which different determination thresholds for determining unauthorized authentication are used between the case where an authorized occupant is detected and the case where an authorized occupant is not detected.

The entire configuration of an on-vehicle control system and the internal configuration of an on-vehicle control device 100 and a mobile device 200 in Embodiment 5 are the same as those in Embodiment 1, and the description thereof will not be made.

Figure 8:
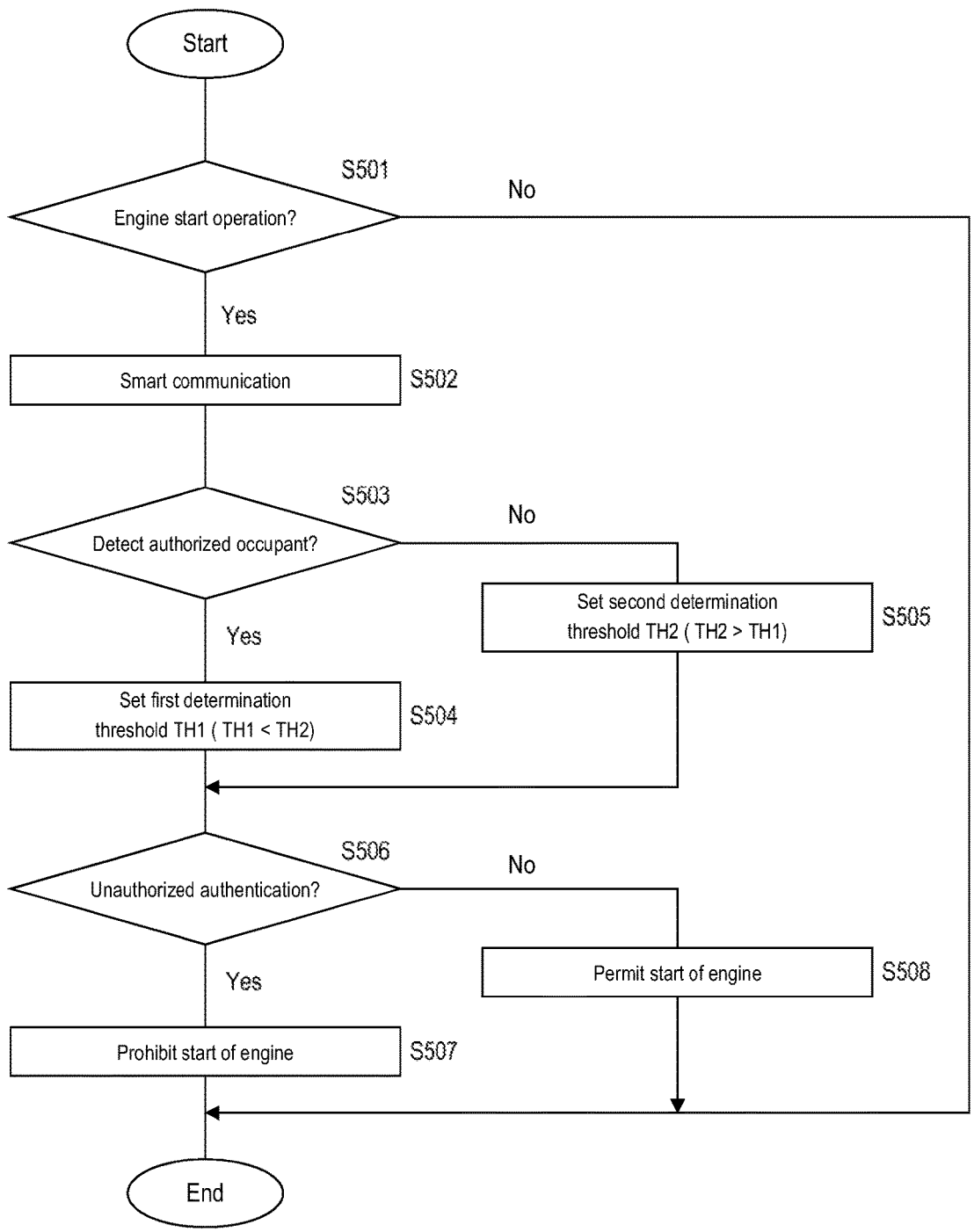
FIG. 8 is a flowchart showing a processing procedure executed by an on-vehicle control device according to Embodiment 5.

FIG. 8 is a flowchart showing a processing procedure executed by the on-vehicle control device 100 according to Embodiment 5. The on-vehicle control device 100 executes the following processing at a regular timing, for example. The control unit 101 first determines the presence or absence of engine start operation (step S501). More specifically, the control unit 101 determines whether or not a signal indicating that the engine start switch 111 is operated is input through the input unit 103. When the engine start operation is absent (S501: NO), the control unit 101 ends the processing according to this flowchart.

When the engine start operation is present (S501: YES), the control unit 101 conducts smart communication (step S502). More specifically, the control unit 101 outputs to the mobile device 200 a response request signal for requesting a response from the LF transmission unit 106 and transmits the signal as an LF signal to the outside of the vehicle C through the LF transmission antennas 106a-106e. Furthermore, the control unit 101 receives a response signal (RF signal) transmitted from the mobile device 200 having received the response request signal through the RF reception unit 107. The response signal transmitted from the mobile device 200 includes the authentication information, and thus the control unit 101 authenticates the mobile device 200 based on the authentication information.

Next, the control unit 101 determines whether or not an authorized occupant is detected (step S503). As described above, it is possible to determine that the authorized occupant is detected in the case where a signal is received that is transmitted from the mobile device 200 when the unlocking operation (keyless entry) of the vehicle doors is established or when the answer back button is operated, in the case where the biometric information of the authorized occupant is read, or the like.

When the authorized occupant is not detected (S503: NO), the control unit 101 sets the determination threshold used when the presence or absence of unauthorized authentication in the smart communication is determined to a first determination threshold TH1 (step S504). On the contrary, when the authorized occupant is detected (S503: YES), the control unit 101 sets the determination threshold to a second determination threshold TH2 different from the first determination threshold TH1 (step S505). Here, the second determination threshold TH2 is set so as not to easily determine the presence of unauthorized authentication in comparison with the first determination threshold TH1 at step S506 to be described later. In one example, the second determination threshold TH2 is a value larger than the first determination threshold TH1. Alternatively, depending on the determination method at step S506, the second determination threshold TH2 may be a value smaller than the first determination threshold TH1.

Next, the control unit 101 determines the presence or absence of unauthorized authentication by using the determination threshold set at step S504 or S505 (step S506). Here, the control unit 101 determines the presence or absence of the unauthorized authentication of the mobile device 200 using a relay attack by employing the well-known method. For example, the control unit 101 can determine that the unauthorized authentication is present when the signal strength of the RF signal received by the RF reception unit 107 is larger than the determination threshold (the first determination threshold TH1 or the second determination threshold TH2).

When determining that the unauthorized authentication is present (S506: YES), the control unit 101 prohibits the start of the engine (step S507). In this case, the control unit 101 ends the processing according to this flowchart without outputting a control signal for controlling the operation of the engine starter 121.

On the contrary, when determining that the unauthorized authentication is absent at step S506 (S506: NO), the control unit 101 permits the start of the engine (step S508). In this case, the control unit 101 outputs a control signal for controlling the operation of the engine starter 121 from the output unit 104 to start the engine of the vehicle C.

From the above, in the present embodiment, the determination threshold can be set so as not to easily determine the presence of the unauthorized authentication when the authorized occupant is detected, which reduces the possibility of erroneously determining a signal transmitted from the mobile device carried by the authorized occupant as a relay attack.

It is to be understood that the embodiments disclosed here are illustrative in all respects and not restrictive. The scope of the present disclosure is defined by the appended claims, and all changes that fall within the meanings and the bounds of the claims, or equivalence of such meanings and bounds are intended to be embraced by the claims.

The invention claimed is:

1. An on-vehicle control device including a transmission unit that transmits, in response to operation of instructing a start of a driving source causing a vehicle to drive, to a mobile device a response request signal requesting a response and an authentication unit that authenticates the mobile device based on a response signal from the mobile device in response to the response request signal, and performing start control of the driving source depending on success or failure of authentication by the authentication unit, comprising:
 a determination unit that determines a presence or an absence of unauthorized authentication for the authentication unit;
 a detection unit that detects an authorized occupant for the vehicle;
 a start prohibition unit that prohibits the start of the driving source in a case where the determination unit determines that unauthorized authentication is present for the authentication unit; and
 a start permission unit that permits the start of the driving source regardless of determination by the determination unit in a case where the detection unit detects the occupant, wherein the determination unit is configured not to perform the determination as to the presence or absence of the unauthorized authentication in a case where the detection unit detects the occupant and the determination unit resumes the determination as to the presence or absence of the unauthorized authentication in a case where a predetermined time has elapsed since detection of the occupant by the detection unit.

2. The on-vehicle control device according to claim 1, further comprising:
 a reception unit that receives a control signal transmitted from the mobile device in response to operation instructing unlocking of a door of the vehicle; and
 an unlocking control unit that performs unlocking control of the door based on the control signal received by the reception unit, wherein
 the detection unit determines that the occupant is detected in a case where the door is unlocked by unlocking control by the unlocking control unit.

3. The on-vehicle control device according to claim 1, wherein the start permission unit permits the start of the driving source when the detection unit detects the occupant even in a case where a determination result of the presence of unauthorized authentication is obtained by the determination unit.

4. An on-vehicle control method of transmitting to a mobile device, in a response to operation of instructing a start of a driving source causing a vehicle to drive, a response request signal requesting a response, and executing authentication processing for authenticating the mobile device based on a response signal from the mobile device in response to the response request signal, and performing start control of the driving source depending on success or failure of authentication by the authentication processing, comprising:
 determining a presence or an absence of unauthorized authentication for the authentication processing;
 detecting an authorized occupant for the vehicle;
 prohibiting the start of the driving source in a case where the presence of unauthorized authentication for the authentication processing is determined;
 permitting the start of the driving source regardless of determination as to the presence or absence of the unauthorized authentication in a case where the occupant is detected;
 not determining as to the presence or absence of the unauthorized authentication in a case where the occupant is detected; and
 resuming the determination as to the presence or absence of the unauthorized authentication after a redetermined time has elapsed since detection of the occupant.

5. A computer program causing an on-vehicle control device to execute processing of transmitting to a mobile device, in response to operation of instructing a start of a driving source causing a vehicle to drive, a response request signal requesting a response in response to operation of instructing a start of a driving source causing a vehicle to drive, and executing authentication processing for authenticating the mobile device based on a response signal from the mobile device in response to the response request signal, and performing start control of the driving source depending on success or failure of authentication by the authentication processing, comprising:
  determining a presence or an absence of unauthorized authentication for the authentication processing;
  detecting an authorized occupant for the vehicle;
  prohibiting the start of the driving source in a case where the presence of unauthorized authentication for the authentication processing is determined;
  permitting the start of the driving source regardless of determination as to the presence or absence of the unauthorized authentication in a case where the occupant is detected;
  not determining as to the presence or absence of the unauthorized authentication in a case where the occupant is detected; and
  resuming the determination as to the presence or absence of the unauthorized authentication after a predetermined time has elapsed since detection of the occupant.

6. The on-vehicle control device according to claim 2, wherein the determination unit is configured not to perform the determination as to the presence or absence of the unauthorized authentication in a case where the detection unit detects the occupant.

7. The on-vehicle control device according to claim 2, wherein the start permission unit permits the start of the driving source when the detection unit detects the occupant even in a case where a determination result of the presence of unauthorized authentication is obtained by the determination unit.

8. An on-vehicle control device including a transmission unit that transmits, in response to operation of instructing a start of a driving source causing a vehicle to drive, to a mobile device a response request signal requesting a response and an authentication unit that authenticates the mobile device based on a response signal from the mobile device in response to the response request signal, and performing start control of the driving source depending on success or failure of authentication by the authentication unit, comprising:
  a determination unit that determines a presence or an absence of unauthorized authentication for the authentication unit;
  a detection unit that detects an authorized occupant for the vehicle;
  a start prohibition unit that prohibits the start of the driving source in a case where the determination unit determines that unauthorized authentication is present for the authentication unit; and
  a start permission unit that permits the start of the driving source regardless of determination by the determination unit in a case where the detection unit detects the occupant, wherein the determination unit is configured not to perform the determination as to the presence or absence of the unauthorized authentication in a case where the detection unit detects the occupant and the determination unit resumes the determination as to the presence or absence of the unauthorized authentication in a case where a predetermined operation is accepted after the detection unit detects the occupant.

9. The on-vehicle control device according to claim 8, further comprising:
  a reception unit that receives a control signal transmitted from the mobile device in response to operation instructing unlocking of a door of the vehicle; and
  an unlocking control unit that performs unlocking control of the door based on the control signal received by the reception unit, wherein
  the detection unit determines that the occupant is detected in a case where the door is unlocked by unlocking control by the unlocking control unit.

10. An on-vehicle control method of transmitting to a mobile device a response request signal requesting a response in response to operation of instructing a start of a driving source causing a vehicle to drive, executing authentication processing for authenticating the mobile device based on a response signal from the mobile device in response to the response request signal, and performing start control of the driving source depending on success or failure of authentication by the authentication processing, comprising:
  determining a presence or an absence of unauthorized authentication for the authentication processing;
  detecting an authorized occupant for the vehicle;
  prohibiting the start of the driving source in a case where the presence of unauthorized authentication for the authentication processing is determined;
  permitting the start of the driving source regardless of determination as to the presence or absence of the unauthorized authentication in a case where the occupant is detected;
  not determining as to the presence or absence of the unauthorized authentication in a case where the occupant is detected; and
  resuming the determination as to the presence or absence of the unauthorized authentication when a predetermined operation is accepted after the detection unit detects the occupant.

11. A computer program causing an on-vehicle control device to execute processing of transmitting to a mobile device a response request signal requesting a response in response to operation of instructing a start of a driving source causing a vehicle to drive, executing authentication processing for authenticating the mobile device based on a response signal from the mobile device in response to the response request signal, and performing start control of the driving source depending on success or failure of authentication by the authentication processing, comprising:
  determining a presence or an absence of unauthorized authentication for the authentication processing;
  detecting an authorized occupant for the vehicle;
  prohibiting the start of the driving source in a case where the presence of unauthorized authentication for the authentication processing is determined;
  permitting the start of the driving source regardless of determination as to the presence or absence of the unauthorized authentication in a case where the occupant is detected;
  not determining as to the presence or absence of the unauthorized authentication in a case where the occupant is detected; and
  resuming the determination as to the presence or absence of the unauthorized authentication when a predetermined operation is accepted after the detection unit detects the occupant.

* * * * *